Feb. 4, 1958  R. C. SHIPMAN ET AL  2,822,021
TUBELESS TIRE AND RIM
Filed Sept. 9, 1952  5 Sheets-Sheet 1
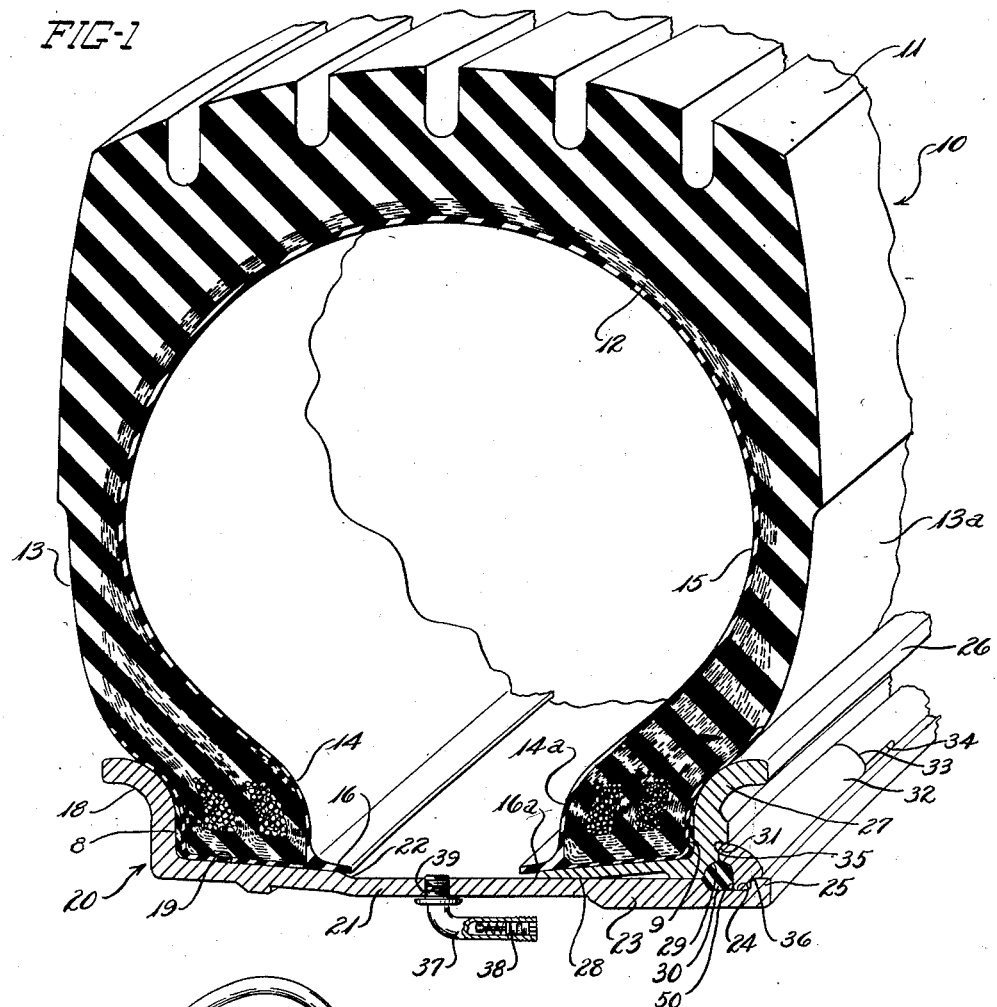
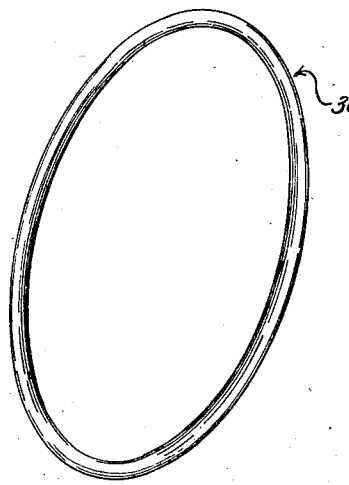
INVENTORS.
ROBERT C. SHIPMAN
THOMAS A. ROBERTSON
BY
W. A. Fraser
ATTY-

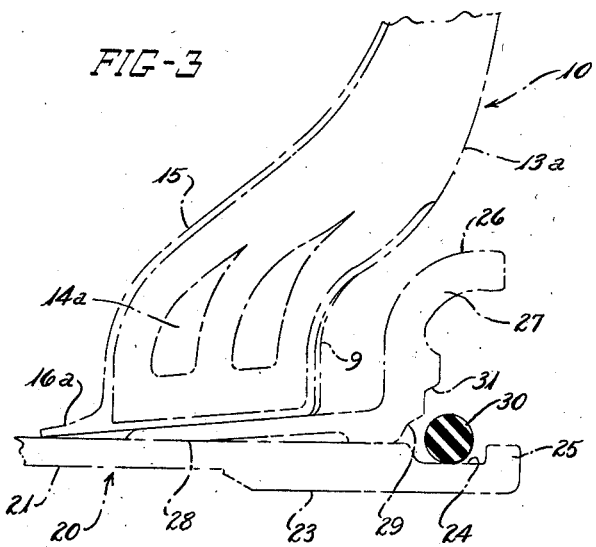
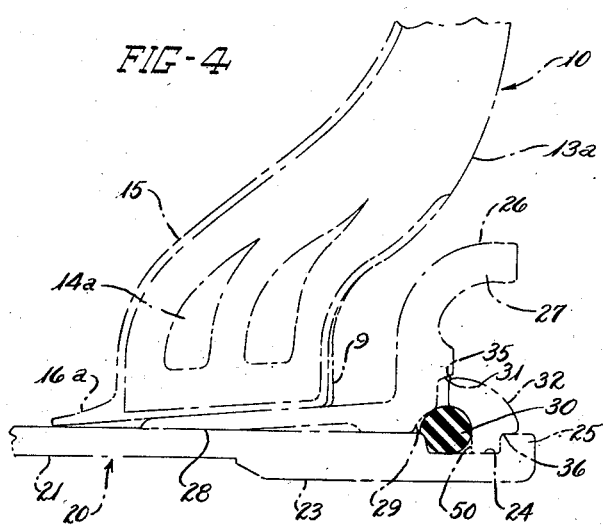

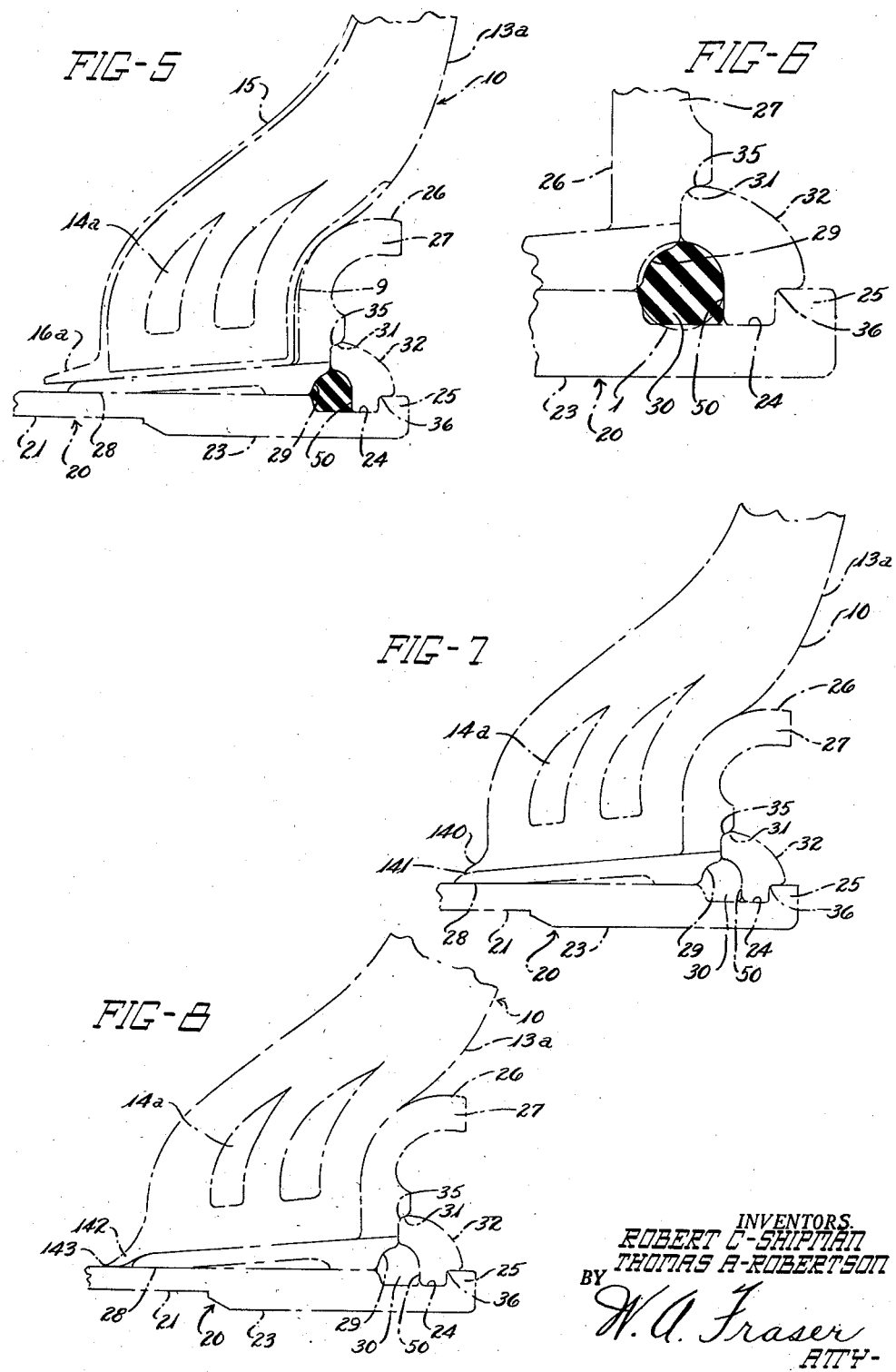

INVENTORS
ROBERT C. SHIPMAN
THOMAS A. ROBERTSON
BY W. A. Fraser
ATTY.

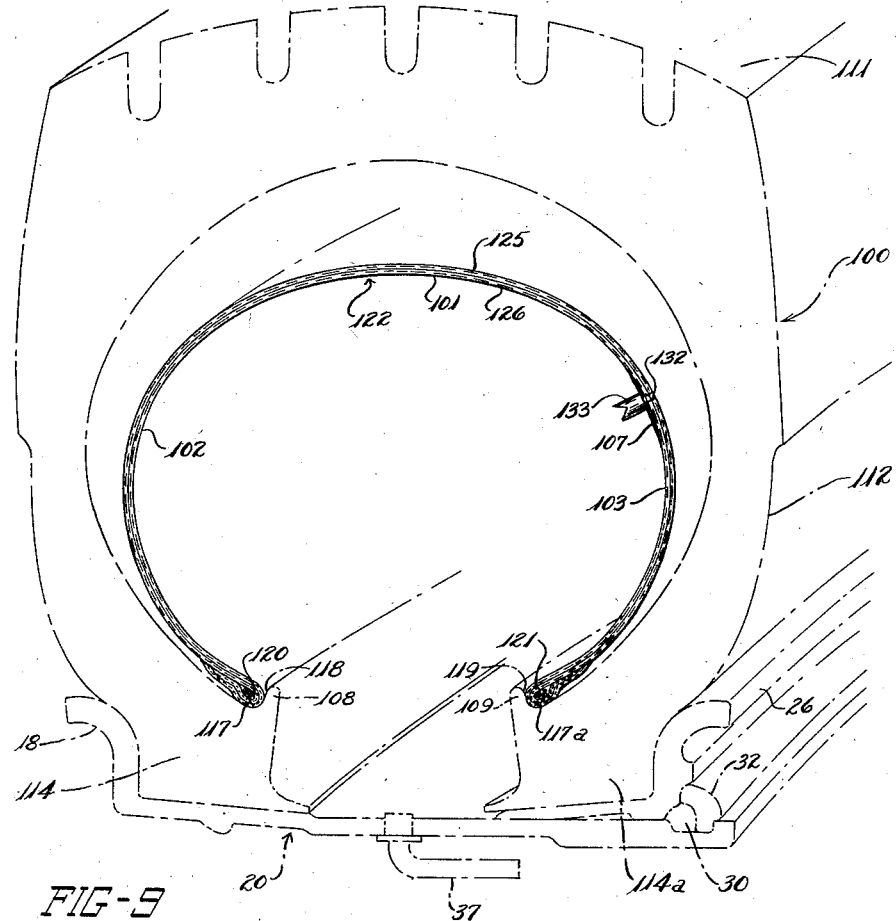

United States Patent Office 2,822,021
Patented Feb. 4, 1958

2,822,021

TUBELESS TIRE AND RIM

Robert C. Shipman and Thomas A. Robertson, Akron, Ohio, assignors to The Firestone Tire & Rubber Company, Akron, Ohio, a corporation of Ohio Application September 9, 1952, Serial No. 308,626

16 Claims. (Cl. 152—410)

This invention relates to tubeless pneumatic tires and rims for same. More particularly, the invention relates to a combination of a tubeless truck tire mounted on a rim of the type having an endless base and a removable side ring.

While tubeless pneumatic tires have been well known for many years, and such passenger car tires of the open-beaded straight-side construction are now a regular product of at least two large tire manufacturers, no one, before the present invention, has produced a satisfactory tubeless truck tire and rim. In order to provide an operative tubeless truck tire, the problem of preventing tire inflationary air escaping at the juncture of components of the rim had to be solved. These rims necessarily have a removable side ring and some a lock ring which results in a circumferentially extending crack between said removable parts and the rim base through which cracks inflationary air would normally escape.

One object of the present invention is to provide a rim for a tubeless truck tire, said rim having a removable side ring and lock ring which in service has air tight joints between said rim base and its removable parts.

Another object of the invention is to provide a tubeless tire having air impervious walls and so constructed as to form a substantial air seal between the toes of the tire beads and the base of a tire rim upon which it is being mounted during the initial inflating period of the tire whereby the tire beads are forced, by the air pressure in the tire, laterally outward against the rim side rings.

A further object is to provide a tubeless pneumatic truck tire rim having a tire inflating stem in direct and fluid tight contact with the rim.

A still further object of the invention is to provide a rim such as set out above but having the additional structural feature of both tire bead seats being tapered.

Another object of the invention is to provide a diaphragm for use with an open-beaded pneumatic truck tire, said diaphragm itself being open-beaded in shape and being composed principally of one or more plies of rubberized fabric attached at their edges to annular inextensible members, said diaphragm being removably mounted on the aforesaid diaphragm seats.

Yet another object is to provide an inflatable auxiliary load-supporting member for a tubeless tire, which member may conveniently be removed for the purpose of repairing a tire in which it is used and may be replaced after the tire has been repaired.

Another object of the invention is to provide a construction at the toe of a tire bead which forms an air-seal between the tire bead and the base of a removable rim tire ring upon which the tire bead is mounted.

An additional object of the invention is to provide a construction at the toe of a tire bead which forms an air-seal between said bead and the base of a rim upon which the bead is mounted.

The foregoing and other objects of the invention are achieved by the provision of a rim including an endless base portion having an integral flange at one side and a gutter at the other; a transversely split locking ring removably received in the gutter; an endless removable side ring having a tapered bead seat integral therewith; a molded and vulcanized sealing ring of high grade rubber disposed between said base, locking ring, and side ring; a truck tire having an air impervious lining, said tire terminating at its toes in continuous laterally inwardly extending fins which are adapted to function as flutter valves to seal or substantially seal the initial tire inflationary air within the tire, whereby the tire beads are forced radially outward and pressed against the integral flange and said removable side ring, which removable side ring in turn presses laterally outward against said locking ring and rubber ring preventing the escape of the tire inflationary air between the rim elements.

For a better understanding of the invention, reference should be had to the accompanying drawings, wherein:

Fig. 1 is a fragmentary perspective view partly in cross-section of a tire and rim of a particular embodiment of the present invention;

Fig. 2 is a perspective view of the rubber ring shown in Fig. 1;

Fig. 3 is a fragmentary phantom view of the right hand bead portion of Fig. 1, but drawn to larger scale and illustrating the relative position of the tire and rim members just prior to placing the locking ring in the rim gutter;

Fig. 4 is the same as Fig. 3 except the locking ring is shown in the rim gutter and the tire bead and side ring have been moved toward the locking ring as will happen as the internal air pressure within the tire increases, such movement continuing until the members of the assembly occupy the relative position shown in Fig. 1;

Fig. 5 is an enlarged fragmentary phantom view of the right hand bead portion of Fig. 1;

Fig. 6 illustrates the deformation of the gasket of Fig. 5 in its operative position, the dot-dash line showing the normal contour of the gasket;

Fig. 7 is the same as Fig. 5 except a modified toe of the bead is shown;

Fig. 8 is the same as Fig. 5 except another modification of the toe of the bead is shown;

Fig. 9 is a sectional view similar to Fig. 1, but showing the tire modified to receive a diaphragm, and the diaphragm and tire mounted upon a rim showing the normal relative position of the components of the combination thereof;

Figure 10:
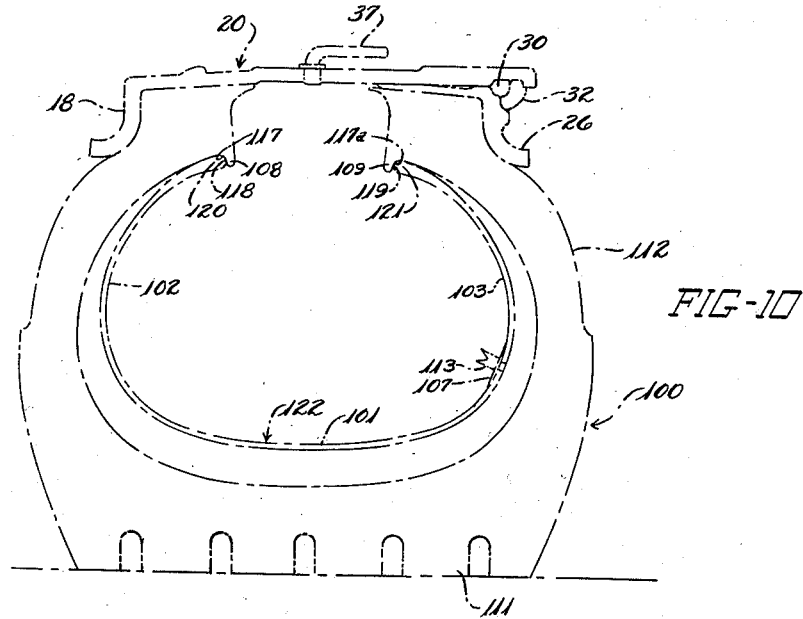
Fig. 10 is a phantom view similar to Fig. 9 illustrating the relative position of the components of the combination of Fig. 9 at the road contact area of the tire in service.

Referring now in detail to the drawings, the reference numerals 10 and 20 indicate generally a tubeless tire and a tire rim, respectively.

The tire 10 comprises the usual tread 11, rubberized fabric plies 12, sidewalls 13, 13a, bead portions 14, 14a, an air impervious lining 15, preferably composed of butyl, and laterally inwardly extending continuous, flexible fins 16, 16a. The radial inner surface of fins 16 and 16a lie substantially in the same plane as the radial inner surface of the tire bead portion of which it is an extension. It is to be understood, however, that the plane of said fins may be changed relative to the beads in order to affect their mobile sensitivity to the flow of air. Such changes may be desirable as between fins composed of compounds of different flexing characteristics.

Rim 20 comprises an endless side flange 18, a tapered tire bead seat 19 which seat merges into a rim base 21 by a radially inwardly sloped step-off 22. Base 21, opposite flange 18, has a thickened portion 23, a continuous radially outwardly facing gutter 24, and a continuous radially outwardly extending edge portion 25. An integral endless removable side flange 26 is mounted on base 21 in laterally slidable relation therewith. Side flange 26 comprises a tire side flange portion 27 and a tapered tire bead seat 28, said seat 28 extending laterally inwardly of flange portion 27 a distance sufficient to substantially underlie the entire bead base of a tire with which it is to be used. A continuous groove 29 is disposed at the corner of flange 26 and is adapted to contact a portion of a rubber or rubber-like sealing ring 30 as will be understood as the description continues. Adjacent and radially outward of groove 29 in flange 26 is a circumferentially extending continuous radially outwardly sloped beveled portion 31 adapted to receive and radially overlie a rounded tip portion 35 of a lock ring 32 as will be described. It will be seen by reference to the drawings that elements 21, 26 and 32 make contact along continuous circumferentially extending splits or joints through which inflationary air may pass from the interior of the tire mounted on the rim. Lock ring 32 has a transverse split 33, a lock ring removing tool notch 34, tip 35 and a circumferentially extending groove 36, the latter providing a fit between the locking ring and the edge portion 25. It is to be noted that beveled portion 31 on flange portion 27, in the form of a shoulder, overlying projecting tip portion 35 bears on lock ring 32 thereby transmitting the tire load from flange 26 through ring 32 to base 21. This arrangement acts as a safety device by providing a means of preventing the lock ring 32 moving from its assembled position both during inflation and subsequent operation of the tire and rim assembly.

The sealing ring 30 shown is round in sectional contour, but it is to be understood that the section may be changed to any shape found satisfactory, as for example, wedge shape, U shape or the like. However, the cross-sectional area of the sealing ring must bear a definite relation to the sectional area of chamber 50, defined by base 21, flange 26, and locking ring 32, which chamber the sealing ring occupies in service. The total volume of rubber in the sealing ring is preferably equal to the volume of chamber 50 although it will function properly if the volume of the ring is slightly more or less than the volume of chamber 50. Since rubber is noncompressible for practical purposes, it is desirable that the sealing ring be distorted but does not block the movement of flange 26 from contact with lock ring 32.

A tire inflating valve stem 37 having conventional valve means 38 is in threaded relation with an internally threaded hole 39 formed through the base 21 of rim 20. A novel feature of the attachment of stem 37 to the said rim is that pipe threads are used and stem 37 is tightened up in hole 38 until a permanent fluid tight seal is formed at said hole without the use of rubber washers or the like. If desired, a valve stem may be attached to the said rim base by other methods, as for example, by the use of a valve stem having an upset head and threaded to receive a rim nut over a rigid washer with a rubber washer between said upset base and the rim base, and another rubber washer between said rigid washer and the rim base whereby a fluid tight seal may be made by clamping the rubber washers by tightening the rim nut as will be understood by those familiar with the art.

Since heavy tire rims, such as 20, have rough surfaces, applicants provide endless rubber gaskets 8 and 9 which are preferably removably disposed between the lateral outer sides of the tire beads and rim flanges 18 and 27, respectively. These gaskets are preferably composed of rubber or rubber-like material, but any material found satisfactory may be used. The primary function of the gaskets is to protect the tire beads from the roughness of the surface of the rim flanges and to insure an air seal between the tire beads and the rim side flanges. The gaskets 8 and 9, if rubber, are molded and vulcanized approximately one-eighth inch thick. As an equivalent of the gaskets 8 and 9, a similar thickness of similar material may be permanently attached to either or both lateral confronting sides of the said tire bead or removable flange without departing from the spirit of the invention.

The assembly of tire 10 and rim 20 and their combined operation will now be explained. Referring first to Fig. 3, it is to be understood that in the beginning of the assembly of the tire and rim that the removable flange 26, the rubber ring 30 and the lock ring 32 are not in position. First, gasket 8 is placed in position against flange 18 as shown in the drawing and next, the tire bead 14 (see Fig. 1) is passed over the rim edge 25 and pressed as close to tire flange 18 as can be done manually or by any means available. Next, the bead 14a is passed over rim edge 25 and for some distance toward bead 14 after which the removable flange 26, with gasket 9 in position, is applied to the rim with the bead seat portion 28 extending under bead 14a as will be seen by reference to Fig. 3. The sealing ring 30 is next placed into gutter 24 and locking ring 32 is buttoned into position as illustrated in Fig. 4.

By reference to Fig. 4, it will now be seen that ring 30 has a cross-sectional area somewhat less than the opening between the rim, the removable flange and the locking ring just before these rim elements are forced into final operative position. When the assembly just mentioned has been completed, the tire is ready for its inflationary air which is applied through valve stem 37 in a manner such as is common in inflating tire inner tubes. It is to be noted that fin 16a overhangs the edge of bead seat 28 and that the fin's edge is close to, but does not quite touch, the rim base 21.

By reference to Fig. 1, it will be seen that the edge of fin 16 is close to, but does not touch, rim base 21. When inflationary air flows into tire 10, the air begins to escape past the fins 16, 16a and bead portion 14 and its contact with rim 20; and bead portion 14a and its contact with removable flange 26; and also between flange 26 and rim base 21 by rubber ring 30 and lock ring 32. The flow of air and its escape functions to flutter the edges of fins 16 and 16a against rim base 21 in the manner of a flutter valve thereby sealing up substantially preventing the said escape of air, after which the continued inflating of the tire builds up internal pressure, within the tire, which forces the beads thereof laterally outwardly pressing bead portions 14 against flange 18 and bead portion 14a and removable flange 26 against rubber ring 30 and locking ring 32 after which bead portion 14 is pressed firmly against flange 27. The contact of bead portion 14 against flange 18 and also against beveled bead seat 19 provides an air-tight seal. The pressing of the bead portion 14a against removable flange 26 as just described provides an air-tight seal between the latter mentioned bead portion and the removable flange.

It will be seen by reference to Figs. 1 and 5 that the movement of flange 26 into its final position in contact with locking ring 32 results in the distortion of ring 30 from its molded shape or substantially to the shape of chamber 50. The distortion of ring 30 is affected by pressure of the walls of chamber 50 against said ring and the elastic characteristic of the rubber or rubber-like material of the ring provides a constant and continuing pressure of ring 30 against side ring 26 and base 21, whereby a seal against leakage of tire inflationary air under tire bead seat 28 is provided. Since the beads 14 and 14a are pressed against tire rim flanges 18 and 27, respectively, in air tight relation therewith, and, as is to be understood, valve stem 37 is in air tight relation with base 21, and the air impervious lining 15 extends about the beads 14 and 14a to the top of flanges 18 and 27, it will be seen that upon the inflating of tire 10 through valve 37, as explained, that the elements of the combined tire 10 and rim 20 as shown in Fig. 1 constitute a novel combination of a tubeless truck tire and a truck tire rim adapted for a tubeless truck tire.

It is believed that upon the complete sealing of the inflationary air within the tire that the fins 16 and 16a will recover their original molded position relative to the tire bead. At any rate, it is not necessary that the fins 16 and 16a function 100 percent in sealing inflationary air for the proper seating of the tire bead on their rims as explained and at least in some cases the air on both sides of the said fins will finally equalize in which event the fins would return to their molded position, illustrated in Fig. 1, thus leaving the contact of bead portion 14a against flange 18 and bead seat 19 and contact of the bead portion 14a against flange 27 and bead seat 28 together with the sealing effect of ring 30 as being the ultimate sealing means of the said combined rim members.

Fig. 6 illustrates the deformation to which the gasket 30 is subjected, the normal cross-sectional contour of gasket 30 being shown by a dot-dash line 1.

A fin 140 shown in Fig. 7 is a modification of fin 16a. Fin 140 is continuous and terminates in a thin edge 141 preferably of no greater diameter than the diameter of the bead seat 28 at the normal edge 141 contact position thereon. In the arrangement just described, edge 141 presses radially inwardly against seat 28 forming an air seal against leaks between bead 14a and seat 28. If this last-mentioned seal for any reason fails to function, then gasket 9 will function to stop escape of air between bead 14a and flange 27 of side ring 26. In this modification, fin 140 functions in the same manner as fin 16a until the buidup of tire inflationary pressure has forced bead 14a and side ring 26 to approximately their ultimate position at which time gasket 30 progressively comes into sealing contact with adjacent surfaces. Applicants have found that at this point the inflationary air pressure is sufficient to force both the 14a and side ring 26 into their operative positions since the volume of air leak just prior to the final seal is very small.

While the modification has been described relative to the removable ring 26, its operation relative to bead 14 and rim seat 19 will be obvious and it is considered a further discussion is unnecessary.

Another modification of the invention is shown in Fig. 8 wherein a fin 142 terminates in a thin edge 143, said fin 142 extending laterally inwardly from the tire beads a distance sufficient to overlie the edge of base 28 and to flutter radially inwardly and seal the joint between this edge and the rim base 21. If fin 142 fails to seal, then sealing gaskets 9 and 30 will provide the required seal as heretofore explained. It is to be understood that a fin 142 may be formed on bead 14 or fin 16a or 140 may be used as found desirable.

In one embodiment of the tubeless truck tire of the present invention, safety means are provided in the tire which means provide an auxiliary load-carrying member that comes into functional operation when a tire blows out, thereby preventing a complete collapse of the tire and thus enabling the driver of an automobile to slow down or stop without the truck or bus swerving or getting out of control. To this end, the invention contemplates the provision of a truck tire in which diaphragm seats are provided on the inner wall of the tire adjacent the beads thereof, said seats receiving inextensible marginal edges of a safety diaphragm mounted completely within the tire.

Referring now to Fig. 9, there is shown a tire 100 comprising the usual tread portion 111, sidewall 112, bead portions 114 and 114a, tire rim 20, and inflation valve identified generally as 37. The tire beads are of the straight side type comprising the usual reinforcing wires in the beads by which the tire is held on the rim. The present tire 100 has, as novel and special elements, an inside lining composed of butyl shown in Fig. 1, and diaphragm seats 117 and 117a molded integrally with the tire beads 114 and 114a, respectively, in the form of ledges on the lateral inner surface of said beads. Said ledges have uninterrupted, radially outwardly facing grooves 118 and 119 and are preferably composed of flexible rubber and, as will be seen by reference to the drawings, are adapted to receive in said grooves and to seat, in substantially fluid-tight contact, the inextensible edge portions 120 and 121 of diaphragm 122, thereby preventing the escape of air from the inner chamber between said diaphragm edges and their seats.

The tire 100 may be built in any usual manner, as for example, upon a shoulder tire-building drum. The ledges 117 and 117a may be formed in any way found satisfactory as by extruding them to substantially their molded shape and applying them to the beads of a tire before or after the tire has been removed from its building drum and before the tire is molded. In this case, namely when the ledge is preformed, the tire may be cured without a curing bag and with fluid molding pressure in direct contact with the inside of the tire. Another expedient of molding would be to form the ledges by adding rubber to the lateral inside faces of the tire beads and then molding and vulcanizing the tire in the usual manner employing a curing bag, but additionally providing ledge-molding means at the base of the curing bag in the form of a bull ring having a contour adapted to mold the ledges to desired shape. The use of a curing bag and a bull ring in combination to mold a tire at the tire beads is a well-known practice in the tire manufacturing industry and for that reason it is considered unnecessary to describe the molding of ledges 117 and 117a in detail.

The diaphragm 122, as will be seen by reference to Fig. 9, comprises a crown wall 101, and sidewalls 102 and 103 composed of two layers of rubberized cord fabric 125 and 126 and also includes inextensible bead-like edge members 120 and 121. The plies 125 and 126 may consist of rubberized cotton tire cord fabric, wire or any other fabric found satisfactory, but preferably consists of strong, light, rayon cord fabric embedded in a thin sheet of rubber with the cords of the separate plies crossing at an angle of approximately 45 degrees. Diaphragm 122 is drum built, molded and vulcanized on a curing bag in substantially the same manner as a tire which will be readily understood by those familiar with the art, and it is therefore unnecessary to set out the steps of producing said diaphragm.

After molding and vulcanizing, the diaphragm is removed from the mold and a hole 132 is punched through its wall, and a molded rubber valve 133 having a base 107 is attached to the inside surface of the diaphragm at a point on the diaphragm wall approximately half-way between the edge and the center thereof. Valve 133 is a flutter type and functions in the same way as does valve 17 in H. K. Chandley, Patent No. 2,514,183, issued July 4, 1950, to which reference is made for a detailed description of the valve, the way it functions and its purpose. A valve of this type will permit free passage of air to the outer chamber of the tire during inflation but will be closed, except for a small bleeder passage, when the air from the inner chamber of the tire seeks to flow into the outer chamber when a tire blowout occurs. It is to be understood, however, that if desired, flutter valve 133 may be designed to completely close in event of a tire blowout, thereby retaining the inflation air within the diaphragm 122 without any openings therefrom to the atmosphere. Where air bleeding means is provided in valve 133, it is intended that the driver of an automobile will, in the event of a tire blowout, bring the car to a stop before all diaphragm pressure is lost and change the tire before it receives additional injury by being run deflated. It is to be further understood that the invention is not to be restricted to the specific valve 133 shown, since it is obvious that valves of different construction may be substituted for valve 133 and function satisfactorily. In the arrangement wherein the flutter valve closes completely, it would be possible for the driver of a truck, in the event of a tire blowout, to proceed slowly for a considerable distance without substantial injury to the tire, often making it possible to reach a service station or a place where the truck may be driven off the highway and the tire replaced in safety.

In mounting the diaphragm 122 in the tire 110, the diaphragm is first inserted within the tire casing in similar fashion as an inner tube is placed in regular tires. After the diaphragm has been so inserted, it will be seen that the edges 120 and 121 of the diaphragm lie adjacent to, but not in, the grooves 118 and 119, respectively. These inextensible edges 120 and 121 are next placed in grooves 118 and 119, respectively, by the simple expedient of manually forcing the inextensible members over the rounded, flexible, circumferentially-extending, radially outwardly projecting edges 108 and 109 by pressing by hand or otherwise, the diaphragm edges 120 and 121 against edges 108 and 109, respectively, thereby causing the said inextensible diaphragm edge members to snap into position in grooves 118 and 119, respectively. After the diaphragm has been mounted, as just described, the tire is mounted on its rim as explained above. The tire is inflated in the usual manner through valve 37 and to the usual pressure. The flow of air into the tire during inflation, as in the usual tire inflation, is slow. The opening in the flutter valve 133 is such that the air will pass therethrough as rapidly as it flows into the diaphragm and for this reason, the flutter valve will not close during inflation. When the tire inflation is completed, the air pressure inside and outside the diaphragm will be equal.

Referring now to Fig. 10, the tire shown illlustrates the position of the tire at the ground contact area under normal load relative to the radially outward circumference of the diaphragm 122.

It is to be noted that the inextensible edge portions of the diaphragm 122 have a contour complementary to the contour of grooves 118 and 119, respectively, thereby providing a snug fit between said edges and the surface of said grooves. The inside diameter of the inextensible edges 120 and 121 of the diaphragm are somewhat less than the inside diameter of the bottom of the said grooves, whereby a tight and substantially fluid-tight fit between the edges of the diaphragm and the bottoms of the grooves is assured. The edges of the diaphragm and the grooves, in which said edges are retained, are molded with mechanical exactness, and therefore the arrangement shown disposes the diaphragm within the tire in the exact predetermined position desired whereby the dynamic balance of the tire is not adversely affected. It will also be noted that the seats for the edges of the diaphragm are located in the immediate vicinity of the beads of the tire where little or no tire deflection occurs.

Figure 11:
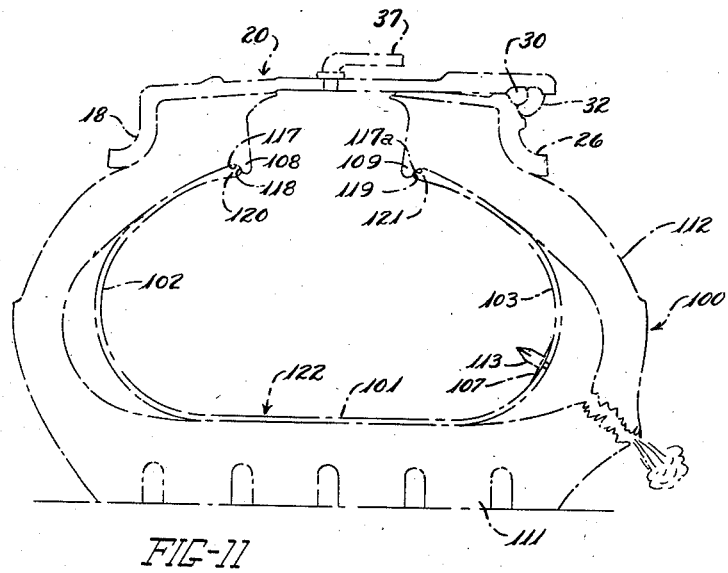
Fig. 11 is similar to Fig. 9, but showing in phantom the relative position of the tire, diaphragm and rim at the ground contact area in the event of a tire blowout.

As will be seen by reference to Fig. 11 when the tire blows out or receives a large puncture, the diaphragm supports the load to which the assembly is subjected at a height substantially higher than would be the case if the auxiliary load-carrying member 122 were not present.

The detailed description of the particular embodiments of the invention illustrated and described herein is not to be construed as limiting the invention thereto. The invention includes all features of patentable novelty residing in the foregoing description and the accompanying drawings.

What is claimed is:

1. In combination a tubeless truck tire and a circumferentially split truck tire rim, said tire comprising an air impervious lining and having extended flexible tire bead toes, said rim having a base portion, an endless removable side ring having an integral tire side flange, said side ring being mounted on said base portion, a lock ring, said side ring being retained in operative position on said base portion by said lock ring; a continuous annular chamber defined by said base portion, removable side ring and lock ring, an endless ring of rubber-like material disposed in said chamber in fluid sealing contact with said base portion and removable side ring, said base portion having a valve stem hole and a tire inflating stem extending therethrough in airtight contact with said rim portion.

2. A rim assembly for tubeless pneumatic tires comprising a rim having an endless, generally cylindrical, base portion at one end of which is formed a circumferentially extending gutter, an integrally formed side flange at the end of the rim opposite the gutter; a removable endless side ring having a laterally inwardly projecting tire bead seat portion formed integrally therewith, said removable ring being dsiposed on said base portion laterally inwardly from the lateral outer edge of said gutter; a tire inflating valve stem in fluid tight relation with an internally threaded hole through the rim base portion; a lock ring having its radial inner edge disposed in said gutter and its outer peripheral portion in contact with said removable ring; a continuous annular chamber defined by said base portion, removable ring and lock ring; a continuous ring of elastic material disposed in said chamber, the cross-sectional area of said chamber being substantially the same as that of the elastic ring, and the sectional contour of the chamber being different from that of the elastic ring whereby the elastic ring presses against the removable flange and base portion in fluid tight relation therewith.

3. In combination a tubeless truck tire and a truck tire rim, said tire comprising an air impervious lining covering the entire inside surface of the tire and continuous flexible fins projecting laterally inwardly from the toes of the tire beads, said fins being adapted to substantially prevent the flow of inflationary air thereby during the inflation of said tire, said rim comprising an endless annular rim base, an endless tire bead retaining side flange formed integrally with and extending radially outwardly from one side of said rim base, a tapered annular bead seat integrally with the rim base adjacent the integral side flange and decreasing in diameter laterally inwardly of the rim base; a radially outwardly facing annular gutter formed in the rim base adjacent the opposite side of the base from the integral flange, a radially outwardly extending flange formed integrally with said opposite side of the rim base and forming the outer side of said gutter; a demountable endless tire bead side ring mounted on said base adjacent the lateral inside portion of said gutter, said demountable ring having an integral continuous annular radially inwardly sloped tire bead seat projecting laterally inwardly therefrom and being of sufficient width to underlie substantially the entire width of a tire bead of a tire size said rim is adapted to mount; a transversely split lock ring having its radial inner edge disposed within said gutter and its peripheral edge in contact with said removable ring whereby the latter is retained in operative position; said base, removable ring and lock ring defining a circumferentially extending continuous chamber therebetween; an endless ring of elastic material disposed in said chamber, the cross-sectional area of said chamber being substantially the same as the cross-sectional area of the ring of elastic material but having a different cross-sectional contour so that said elastic ring is distorted in said chamber and presses against the walls thereof to form an air tight seal therewith.

4. In combination a tubeless truck tire having diaphragm seating ledges inside the tire at the bead portions thereof, a diaphragm of the general shape of an open-beaded tire mounted within said tire on said ledges, said diaphragm normally being spaced from said tire except at said ledges; a circumferentially split rim having a base portion, a removable tire side ring and a lock ring, and an endless sealing ring of elastic material disposed in an endless circumferentially extending chamber defined by said base, removable flange and lock ring.

5. In combination a tubeless truck tire having diaphragm seating ledges formed inside the tire at the bead portions thereof, said bead portions having continuous laterally inwardly projecting flexible fins co-extensive with the base of said bead portions, a diaphragm of the general shape of an open-beaded tire mounted within said tire on said ledges, said diaphragm normally being spaced from said tire except at the immediate area of said ledges, and a circumferentially split truck tire rim having a plurality of rigid members with circumferentially extending splits therebetween and sealing means comprising a ring of elastic material removably retained between said rigid members in fluid tight relation therewith whereby said splits are sealed against air passing therethrough.

6. In combination, a circumferentially split tire rim including a generally cylindrical rim base, a removable tire flange ring encircling said base and providing a circumferential split intermediate said rim base and said flange ring, an elastic sealing ring encircling said rim base and disposed across said circumferential split to prevent the passage of tire inflationary air through said split, and a transversely split lock ring detachably engaged with the end of said rim base laterally outwardly of said removable tire flange ring and said elastic ring to retain same against movement axially off of said rim base.

7. A vehicle tire rim adapted for use with tubeless truck tires comprising a generally cylindrical rim base having a radially outwardly extending tire flange at one end thereof and a radially outwardly facing gutter adjacent the opposite end of said rim base, an annular member having an inner generally cylindrical surface encircling said rim base and providing a circumferential split between said rim base and said annular member, a radially outwardly extending side tire flange carried by said member, an endless elastic sealing ring encircling said rim base and disposed across said circumferential split to prevent the passage of tire inflationary air through said split, and a removable lock ring having the radially inner circumferential portion thereof received in said gutter and the radially outer circumferential portion disposed laterally outwardly of said annular member and said sealing ring to preclude movement of said member and said sealing ring axially off of said rim base.

8. In combination, a circumferentially split tire rim including a generally cylindrical rim base, a removable tire flange ring encircling said base and providing a circumferential split intermediate said rim base and said flange ring, an elastic sealing ring encircling said rim base and disposed across said circumferential split to prevent the passage of the inflationary air through said split, and a transversely split lock ring detachably engaged with the end of said rim base laterally outwardly of said removable tire flange ring and said elastic ring, said lock ring having a radially outwardly extending portion engaged with the outer side of said removable tire flange ring whereby forces resulting from the wall of a mounted tire engaging said flange ring tending to displace said tire flange ring relative to said rim base are transmitted to said rim base through said lock ring.

9. A vehicle tire rim adapted for use with tubeless truck tires comprising a generally cylindrical rim base having a radially outwardly extending tire flange at one end thereof and a radially outwardly facing gutter adjacent the opposite end of said rim base, an annular member having an inner generally cylindrical surface encircling said rim base and providing a circumferential split between said rim base and said annular member, a radially outwardly extending side tire flange carried by said member, an endless elastic sealing ring encircling said rim base and disposed across the circumferential split between said base and said annular member to prevent the passage of tire inflationary air through said split, and a lock ring detachably engaged with said gutter and having a radially outwardly extending portion engaged with the outer side of said annular member whereby forces resulting from the wall of a mounted tire engaging said side tire flange tending to displace said annular member relative to said rim base are transmitted to said rim base through said lock ring.

10. An airtight multi-part rim for a tubeless pneumatic tire comprising an endless rim base, an endless side ring axially movable over at least a portion of the rim base, a split locking ring, one side of the rim base having a gutter removably receiving the locking ring, and holding the locking ring so that part of it extends radially outwardly of the rim base, and a resilient, endless, rubber-like gasket positioned in a circumferentially extending pocket defined by the rim base, the side ring, and the locking ring, the pressure against said gasket in said pocket by axial movement of said endless side ring effecting an airtight seal.

11. A rim assembly for tubeless pneumatic tires comprising a rim having an endless, generally cylindrical, base portion, said base portion having a valve stem hole with a valve stem extending therethrough and in airtight contact with said base portion, one end of said base portion having an integral gutter formed thereon, an integrally formed side flange at the end of the rim opposite the gutter, a removable endless side ring having a laterally inwardly projecting tire bead seat portion formed integrally therewith, said bead seat portion being disposed on said base portion laterally inwardly from the lateral outer edge of the gutter, a lock ring having its radial inner edge disposed in said gutter and its outer peripheral portion in contact with said removable ring, a continuous annular chamber defined by said base portion, removable ring and lock ring, a continuous ring of elastic material disposed in said chamber, the cross-sectional area of said chamber being substantially the same as that of said elastic ring, and the cross-sectional contour of the chamber being different from that of the cross-sectional contour of said elastic ring whereby the elastic ring presses against the removable ring and base in fluid tight relation therewith.

12. A multiple piece tubeless tire rim including a generally cylindrical rim base, at least one removable tire flange ring encircling said base and providing a circumferential split intermediate said rim base and said flange ring, said flange ring having a bead seat portion and a bead retaining flange, seal retaining means formed between said removable tire flange ring and said rim base disposed radially inwardly of the bead seat portion, an elastic sealing ring disposed in said retaining means and encircling said rim base to extend across said circumferential split to prevent passage of tire inflationary air through said split, and a transversely split lock ring detachably engaged with the end of said rim base laterally outwardly of said flange ring and said elastic ring, said lock ring having a radially outwardly extending portion engaged with the laterally outwardly facing side of said flange ring whereby forces resulting from the wall of a mounted tire engaging the bead retaining flange tending to displace said flange ring relative to said rim base are transmitted to said rim base through said lock ring.

13. A multiple piece tubeless tire rim including a generally cylindrical rib base member, at least one removable tire flange ring member encircling said base and providing a circumferential split intermediate said rim base member and said flange ring member, said flange ring member having a bead seat portion and a bead retaining flange, seal retaining means formed in one of said members radially inwardly of the bead seat portion, an elastic sealing ring disposed in said retaining means and encircling said rim base member to extend across said circumferential split to prevent passage of tire inflationary air through said split, and a transversely split lock ring detachably engaged with the end of said rim base member laterally outwardly of said flange ring member and said elastic ring, said lock ring having a radially outwardly extending portion engaged with the laterally outwardly facing side of said flange ring member whereby forces resulting from the wall of a mounted tire engaging the bead retaining flange tending to displace said flange ring member relative to said rim base member are transmitted to said rim base member through said lock ring.

14. A multiple piece tubeless tire rim including a generally cylindrical rim base, at least one removable tire flange ring encircling said base and providing a circumferential split intermediate said rim base and said flange ring, said flange ring having a bead seat portion and a bead retaining flange, seal retaining means formed in said rim base radially inwardly of said flange ring, an elastic sealing ring disposed in said retaining means and encircling said base to extend across said circumferential split to prevent passage of tire inflationary air through said split, and a transversely split lock ring detachably engaged with the end of said rim base laterally outwardly of said flange ring and said elastic ring, said lock ring having a radially outwardly extending portion engaged with the laterally outwardly facing side of said flange ring whereby forces resulting from the wall of a mounted tire engaging the bead retaining flange tending to displace said flange ring relative to said rim base are transmitted to said rim base through said lock ring.

15. A multiple piece tubeless tire rim including a generally cylindrical rim base having a radially outwardly extending edge portion adjacent one end of said rim base providing a laterally inwardly facing shoulder, seal retaining means formed circumferentially in said rim base axially inwardly of said shoulder, an annular member having an inner generally cylindrical surface encircling said rim base and providing a circumferential split between said rim base and said annular member, a radially outwardly extending bead retaining flange carried by said member, a transversely split lock ring having the radially inner circumferential portion thereof engaged with said shoulder and the radially outer circumferential portion disposed laterally outwardly of said annular member whereby said shoulder precludes movement of said member and lock ring axially off said rim base, and an endless elastic sealing ring disposed in said seal retaining means and encircling said rim base to extend across said split to prevent passage of tire inflationary air through said split.

16. A multiple piece tubeless tire rim including a generally cylindrical rim base having a marginal gutter, seal retaining means formed circumferentially in said rim base adjacent said gutter, an annular member having an inner surface encircling said rim base and providing a circumferential split between said rim base and said annular member, a radially outwardly extending tire bead retaining flange carried by said annular member, said annular member having a circumferentially extending shoulder disposed radially outwardly of said inner surface of said annular member on an axially outer surface thereof, a transversely split lock ring having the radially inner circumferential portion thereof engaged in said gutter and a radially outwardly extending portion engaged with the radially inward portion of said circumferential shoulder, whereby said gutter and said circumferential shoulder preclude movement of said lock ring axially and radially respectively off said rim base, and an endless elastic sealing ring disposed in said seal retaining means and encircling said rim base to extend across said circumferential split to prevent passage of tire inflationary air through said split.

References Cited in the file of this patent
UNITED STATES PATENTS

| | | |
|---|---|---|
| 853,594 | Pataud | May 14, 1907 |
| 1,023,454 | Black | Apr. 16, 1912 |
| 1,132,898 | Austin | Mar. 23, 1915 |
| 1,323,457 | De Holczer | Dec. 2, 1919 |
| 1,493,040 | Klaus | May 6, 1924 |
| 1,637,599 | Ballew | Aug. 2, 1927 |
| 1,653,054 | Mack | Dec. 20, 1927 |
| 2,074,284 | Stevenson | Mar. 16, 1937 |
| 2,393,161 | Haushalter | Jan. 15, 1946 |
| 2,409,666 | Comey | Oct. 22, 1946 |
| 2,554,815 | Church | May 29, 1951 |
| 2,563,787 | Keefe | Aug. 7, 1951 |
| 2,563,788 | Keefe | Aug. 7, 1951 |
| 2,587,470 | Herzegh | Feb. 26, 1952 |
| 2,621,700 | Snyder | Dec. 16, 1952 |

FOREIGN PATENTS

| | | |
|---|---|---|
| 533,052 | Great Britain | Feb. 5, 1941 |
| 122,731 | Australia | Nov. 21, 1946 |

OTHER REFERENCES

Tires, Service Station, February 1951, vol. XXXII, No. 7, page 36.